United States Patent [19]

Timm et al.

[11] Patent Number: 4,774,040
[45] Date of Patent: Sep. 27, 1988

[54] PROCESS FOR THE MANUFACTURE OF MOLDED BODIES FROM HEAT RESISTANT POLYURETHANE INTEGRAL FOAM

[75] Inventors: Thies Timm; Herbert Schaper, both of Hamburg; Reinhard Krassig, Seevetal, all of Fed. Rep. of Germany

[73] Assignee: Phoenix Aktiengesellschaft, Hamburg, Fed. Rep. of Germany

[21] Appl. No.: 93,364

[22] Filed: Sep. 4, 1987

[30] Foreign Application Priority Data

Sep. 4, 1986 [DE] Fed. Rep. of Germany ....... 3630104
May 12, 1987 [DE] Fed. Rep. of Germany ....... 3715718

[51] Int. Cl.$^4$ .............................................. C08G 18/14
[52] U.S. Cl. ...................................... 264/51; 264/236; 264/347; 264/DIG. 83; 521/119; 521/121; 521/122; 521/123; 521/128; 521/130
[58] Field of Search ......... 264/51, 236, 347, DIG. 83; 521/119, 121, 122, 123, 128, 130

[56] References Cited

U.S. PATENT DOCUMENTS 4,281,096 7/1981 Nomura et al. ............ 264/DIG. 83

Primary Examiner—Maurice J. Welsh
Attorney, Agent, or Firm—Collard, Roe & Galgano

[57] ABSTRACT

There is provided a process for the manufacture of molded bodies of polyurethane integral foam, such as body parts for the automotive industry, in which the first step of the process, the polyol component is prepared and in the second step of the process the polyol component is reacted with the isocyanate component according to the reaction injection molding method. In the mold and/or after removal from the mold, the molded bodies are subjected to thermal aftertreatment within the framework of a third process step for thirty minutes to three hours at 120° to 180° C. Also, the polyol component may contain nucleating agents, so that the nucleated molded bodies may or may not need be thermally aftertreated.

15 Claims, No Drawings

PROCESS FOR THE MANUFACTURE OF MOLDED BODIES FROM HEAT RESISTANT POLYURETHANE INTEGRAL FOAM

The present invention relates generally to a process for the manufacture of molded bodies, particularly automobile body parts, from heat resistant polyurethane integral foam.

In relation to the manufacture of molded bodies from segmented polyurethane or polyurethane integral foam, numerous monographs have been published, whereby the following tabulation provides a survey of the development work heretofore published in this field:

German OS No. 24 61 521;
German OS No. 27 14 518;
German OS No. 27 18 173;
German OS No. 29 22 769;
German PS No. 26 12 896;
German PS No. 28 19 037;
German PS No. 32 26 818.

Crosslinked and unlinked segmented polyurethanes of different structure can be formed as elastomer-type materials within a wide range of hardness ratings, approximately 60 Shore A to 60 Shore D. Their manifold uses as solid or integral foam moldings are well known, see for instance *Kunststoffhandbuch* [Plastics Manual] published by G. W. Becker; *Polyurethane*, vol. 7, D. Braun, published by G. Oertel. The salient features of this class of materials, which make them usable as structural components, are also well known.

The superior properties of segmented polyurethanes are to a large extent attributable to their multiphasic structures. The reaction of diisocyanates with long and short-chain multifunctional compounds, forms block or segmented copolymers with flexible soft sequences as well as those with a rigid, hard structural framework. Such copolymers are not as a rule mutually compatible, so that phase separation of the soft and the hard components occurs. Generally the soft phase forms the continuous phase, in other words the matrix, while the hard phase represents the disperse phase. Phase reversal does not occur except under very high concentrations of the hard segments in the structural chains. However, with such concentrations, the polyurethanes lose their elastomer characteristics. Typical compounds forming the soft phase are reaction products of diisocyanates, for example with macrodiols, such as linear polyether or polyester diols. Compounds forming the hard phase are for example the reaction products of diisocyanates with microdiols and/or diamines, such as butanediol, ethanediol or alkyl-substituted arylene diamines. These low-molecular reaction components are also termed "chain expanders". Notoriously, by varying the molar concentration of reactants, it is possible to vary the hardness and the degree of cross-linkage of polyurethane within broad limits.

Under the given reaction conditions, it appears that phase separation of soft and hard segments is beneficially affected by a difference in the polarity of the underlying structural units. This, however, is subject to limitations for the reason that in the presence of extreme affinity differentials, there may develop exceedingly coarse and heterogeneous system structures, as for example when polybutadiene diols are used as the macrodiol, and these might adversely affect the mechanical and tevchnological spectrum of properties of the ultimate product.

A high degree of cross linkage is advantageous in terms of raising the plasticizing point, at the same time, chemical cross-linking interferes with the formation of an optimal phase strcture. To this end, it is important to start out with a suitable reaction system. However, this subject goes beyond the scope of the present invention and the reader is referred to the publications cited hereinabove.

Because the reaction occurs rapidly, the polyurethanes formed by the polyol/isocyanate reaction in the reaction injection molding (RIM) process do not have enough time to crystallize in an orderly fashion. What ensues is a mixture of amorphous and partly crystallized molecular regions in disarray, which present no more than fair resistance to heat. At temperatures as low as 120° C., the normal RIM grades are subject to irreversible deformation for example when automobile body sections made of this material are inadequately reinforced. Even the intrinsic weight of the part will lead to sink marks or dips.

It is, therefore, the object of the present invention to further develop the above process so as to enhance the heat stability of polyurethane integral foam parts, so that polyurethane automotive body parts may be varnished in so-called On-Line processes.

The above object is accomplished in accordance with the present invention by a process of manufacturing molded bodies of polyurethane integral foam, wherein the polyol component is prepared in a first step and reacted, such as by reaction injection molding, with the isocyanate component in a second step, the molded bodies then being subjected to thermal aftertreatment while in the mold or after removal therefrom for thirty minutes to three hours at 120° to 180° C. If the polyol component contains nucleating agents, the molded bodies may or may not be subjected to thermal aftertreatment.

In the following there are described three process variants I, II and III according to the present invention, based on the following general outline:

PROCESS VARIANT I

The polyol component contains no nucleating agents. The molded bodies are subjected to thermal aftertreatment.

PROCESS VARIANT II

The polyol component contains nucleating agents. The nucleated molded bodies are not subjected to thermal aftertreatment.

PROCESS VARIANT III

The polyol component contains nucleating agents. The nucleated molded bodies are subjected to thermal aftertreatment.

PROCESS VARIANT I

According to the present invention, the third process step involves heating the articles previously produced during the first and second process steps (for example by the RIM process) for thirty minutes to three hours at a temperature of 120° to 180° C. (the annealing process). The random crystalline areas melt in the process, allowing for orderly recrystallization during slow cooling. Crystalline molecular regions coalesce into larger crystallites, thereby yielding an "inner" reinforcement of the material, reflected among other things in enhanced heat stability. By reason of the structural formation, these products are stabilized in the sense that upon renewed exposure to heat, they will not undergo the same deformation as before.

For the annealing process, it is necessary to choose correctly both the conditions and their sequence, in order to attain the desired heat stability. This for example, may be aniticipated in part by just raising the temperature of the mold, and then completed by re-annealing the finished parts at higher temperatures, whereby the latter should preferably be kept at 160° C. taking into account the varnishing conditions. Save for a few exceptions, it has been determined that a re-annealing process immediately following the release of the parts from the molds yields optimal effects insofar as enhanced heat stability is concerned. As a general rule, one hour is an adequate time, but it can be readily recognized that longer times and/or higher temperatures may afford further optimization. There are, however, limits to how high the temperature can be raised, since temperature ranges greater than 180° C. are increasingly accompanied by polymer degradation due to irreversible chemical processes.

Two experimental series will be described hereunder. A description of the sag test is given in the process description at the end hereof. For proper interpretation of the test series, suffice it to say that the lower the sag index, the higher the heat stability of the molded article.

Test series 1

The object is to investigate the effect of annealing temperature upon the sag index.

| Annealing conditions Hours/°C. | Sag, in mm[a] |
|---|---|
| no annealing | 18 |
| 1/120 | 12 |
| 1/130 | 9.5 |
| 1/140 | 8.5 |
| 1/150 | 8.0 |
| 1/160 | 7.5 |
| 1/170 | 5.5 |
| 1/180 | 2.5 |

[a]Polyurethane grade test article based on grafted polyether diols, modified 4,4'-diphenylmethane diisocyanate (MDI) and diethyl toluylene diamine.
RESULT: With increasing annealing temperature, heat stability increases.

Test series 2

The object is to investigate the effect of annealing duration, type of annealing, and quality of test specimen upon the sag index.

| Annealing conditions, hrs/°C. | Sag in mm[a] | Sag in mm[b] |
|---|---|---|
| no annealing | 8.3 | 11.9 |
| 0.5/160 | 3.1 | 9.9 |
| 1/160 | 1.0 | 5.8 |
| 2/160 | 0.6 | 4.5 |
| Stepwise annealing 0.5/120–0.5/160 | 2.9 | 7.7 |

[a]See test series 1
[b]Test specimen of polyurethane grade based on polypropylene glycols, modified MDI and diethyl toluylene diamine.
RESULT: For both test products, heat resistance increases with annealing duration. Gradual annealing is not as effective as annealing at the highest temperature gradient over the entire annealing time period.

Test series 1 and 2 involve testing of plates, in the sense that test plates of the required dimensions were produced for the sag test (see description of process hereinafter). The results of these plate tests may be directly extrapolated to small automotive body parts. Conversely, in the case of major body parts manufactured by the "direct process", if the sag index is determined after the thermal aftertreatment, the mean sag value is 6.2 to 6.7 mm (at 1 hour and 160° C.) and 3.7 to 5.6 mm (at 3 hours and 160° C.), whereby the 3 hour/160° C. treatment falls short of the level attained in the plate test. In this case, the sag index refers to polyurethane grade (a) in test series 1.

PROCESS VARIANTS II AND III

In the manufacture of integral polyurethane-based foam parts, particularly large bulky parts, as intended for use in external cladding of rear, front and side areas of motor vehicles, as protective energy-absorbing sections, bumpers or spoilers, the formation of optimal structures is complicated by the reaction injection molding process. According to the reaction injection molding process, the reaction components are injected into the mold at a high rate of speed. Because of the economically required short cycle times, the reaction mixture is highly reactive. Both of these process parameters taken together entail a high flow velocity and rapid solidification of the material stream. Turbulence is unavoidable, especially in complex molded parts. All in all, therefore, the conditions are unfavorable for a far-reaching phase separation and phase propagation of hard segments. By the same token, annealing processes in the course of manufacture and after release of the parts from the mold are in indispensable prerequisite for the development of a sufficiently heat resistant phase morphology. At the same time, annealing processes at any stage of the production cycle are a cost factor that cannot be overlooked, as they are time-consuming and entail higher energy consumption and substantial investment.

In addition, in the case of large parts or bodies the heat transfer into the interior of the material is a time-consuming process because of the poor heat conductance of the materials, so that annealing times and/or temperatures must be extended or increased at the expense of production economies, whereby it becomes hardly feasible to attain structurally homogeneous parts, unless microwave heating is utilized.

Considering these conditions, it is worthwhile to seek a modified process variant, whereby according to the present invention a supplementary measure is contemplated wherein nucleating agents are utilized to promote the formation of nuclei and accelerate the propagation of hard segment structures in the polymer. The addition of nucleating agents enhances the heat stability of molded articles. Whether or not such heat stability can be further improved by supplementary thermal aftertreatment will depend on the quality of the polyurethane, the type of nucleating agent, the intended use of the molded article and its required properties in relation to heat resistance, not to mention economic considerations.

The nucleating process is highly temperature-dependent and, depending on the substance, reaches a maximum at a given temperature. In terms of energy requirements, nucleation at low temperatures is advantageous, but in contrast, as the temperature is lowered, it becomes increasingly difficult to diffuse the structural elements required for the formation of nuclei, and their transport to the boundary interface is ultimately blocked completely by the rising viscosity of the medium.

The nucleating agents utilized must meet the following requirements:

(a) they must reduce boundary energy;
(b) they must have a melting point higher than the melting point of the polymer;
(c) they must be insoluble in the polymer;
(d) they must be non-volatile; and
(e) they must be chemically inert to the polymer.

Two additional test series utilizing nucleating agents are described in the following:

Test series 3

The object is to investigate the effect of temperature with and without different carbon blacks as nucleating agents (N) upon the sag index.

| Annealing conditions hrs/°C. | Without N | N = 2% by weight[c] | N = 1% by weight[d] |
|---|---|---|---|
|   |   | Sag in mm[a] |   |
| no annealing | 18 | 5 | 10.5 |
| 1/150 | 8 | 1 | 5 |
| 1/160 | 7.5 | 1.2 | 3.4 |
| 1/170 | 5.5 | 1.3 | 2.2 |

[a]Cf. test series 1
[c]Pigment black by ISL Chemie, Pigment Paste B1038
[d]Activated carbon black by Degussa, N220/ISAF
RESULT: Nucleation perceptibly enhanced heat stability.

Test series 4

The object is to investigate the effect of different nucleating agents (N) (quantity, 2% by weight) under different annealing conditions upon the sag index.

|   | Sag in mm[a],[e] | Sag in mm[a],[f] | Sag in mm[a],[g] |
|---|---|---|---|
| Diphenyl Urea | 9.5 | 2.4 | 3.6 |
| Urea | 11.8 | 3.8 | 5.6 |
| N[h] | 8.7 | 4.5 | 6.0 |
| N[i] | 8.6 | 6.3 | 7.8 |
| N[j] | 7.2 | 3.6 | 6.0 |

[a]Cf. Test series 1
[e]Without annealing
[f]Instant annealing, 1 hr at 160° C.
[g]Annealing for 1 hour at 160° C. after 14-day temporary storage at room temperature
[h]Pigment black by Degussa, Special Black SS60
[i]Pigment black by Degussa, Printex 60
[j]Activated carbon black by Degussa, N330/HAF
RESULT: Instant annealing is more effective than annealing following temporary storage. The nucleating effect is relatively speaking most pronounced with diphenyl urea, followed by activated carbon black.

Test series 3 and 4, as test series 1 and 2, involved plate tests also.

DESCRIPTION OF PROCESS VARIANTS I TO III

Using a stirrer, for example the Ultra Turrax High Speed Mixer, and a mixer bowl, the polyol component is prepared; in the case of variants II and III, it contains a nucleating agent. With the aid of a volumetric foaming machine equipped with a mixer head, the polyol component is expanded together with the isocyanate component into the appropriate mold. Standard conditions (column U) and the conditions applicable to test series 1 to 4 (column V) are as follows:

|   | U | V |
|---|---|---|
| Batch temperature of the two components | 50 to 60° C. | 60° C. |
| Mold temperature | 50 to 60° C. | 60° C. |

|   | U | V |
|---|---|---|
| Mold pressing time | 3 to 6 min | 3 min |

As for the details of process technology involved in the preparation and foaming expandsion, reference is made to the art cited hereinabove.

In the event that thermal aftertreatment (annealing) of the polyurethane integral foam molded articles is scheduled for process variants I and III, the annealing may be undertaken in the mold and/or after release from the mold. The results cited for the test series 1 to 4 were obtained with thermal aftertreatment following release from the mold. Once released, the molded articles are placed on a bed plate and thermally aftertreated in an annealing furnace within the framework of a third process step.

Upon completion of the annealing process, the molded article is cooled to room temperature. To verify heat resistance, use is made of the so-called sag test, which is performed in the following manner: the test specimen, a test rod measuring 150 mm in length, 25 mm in width and 3 to 4 mm in thickness is placed securely on a bed plate in such a manner that 50 mm are securely supported and the remaining 100 mm project freely beyond the supporting surface. The parameter measured is the extent of the sag, in mm, at the end of the rod, as compared to the initial status, following 1 hour of heating at 160° C. These are the parameters on which the test series 1 to 4 are based. The lower the sag index (indicated as the "sag"), the greater the heat stability. The effect is unexpectedly marked, as evidenced by the test series 1 to 4.

While a few embodiments of the present invention have been shown and described, it will be obvious that many changes and modifications may be made thereunto without departing from the spirit and scope of the invention.

What is claimed is:

1. In a process for manufacturing molded bodies of polyurethane integral foam, wherein a first step is preparing a polyol component and a second step is reacting the polyol component with an isocyanate component according to the reaction injection molding method, the improvement comprising:
   thermally aftertreating the molded bodies in a third step for thirty minutes to three hours at 120° to 180° C.

2. The process for manufacturing molded bodies as defined in claim 1, wherein the molded bodies are removed from the molds for said thermal aftertreatment step.

3. The process for manufacturing molded bodies as defined in claim 1, wherein the molded bodies remain in the molds for said thermal aftertreatment step.

4. The process for manufacturing molded bodies as defined in claim 1, wherein the molded bodies are subjected to said thermal aftertreatment while in the molds and after removal from the molds.

5. A process for manufacturing molded bodies of polyurethane integral foam, comprising:
   (a) preparing in a first step a polyol component containing a nucleating agent;
   (b) reacting the nucleating agent containing polyol component with an isocyanate component according to the reaction injection molding method; and (c) thermally after-treating the nucleated molded bodies.

6. The process for manufacturing molded bodies as defined in claim 5, wherein the molded bodies are thermally aftertreated while in the molds.

7. The process for manufacturing molded bodies as defined in claim 5, wherein the molded bodies are thermally aftertreated after removal from the molds.

8. The process for manufacturing molded bodies as defined in claim 5, wherein the molded bodies are thermally aftertreated while in the molds and after removal from the molds.

9. The process for manufacturing molded bodies as defined in claim 1, wherein the molded bodies are thermally aftertreated for one to three hours at 130° to 170° C.

10. The process for manufacturing molded bodies as defined in claim 9, wherein the molded bodies are thermally aftertreated at 160° C.

11. The process for manufacturing molded bodies as defined in claim 5, wherein the nucleating agents are selected from the group consisting of pigment blacks; furnace, channel and/or thermal carbon blacks; activated silicic acid and/or silicates; metal oxides of the second and third primary or auxiliary groups in the periodic system; metal carboxylates with melting points greater than 160° C.; low molecular weight or oligomer derivatives of urea and/or thiourea with melting points greater than 160° C.; low molecular weight or oligomer compounds with urethane, allophanate, biuret or isocyanurate structures, having melting points greater than 160° C.; metal halogenides of the first and second primary group of the periodic system, with melting points greater than 160° C.; and combinations thereof, in concentrations of a maximum of 5% by weight in relation to active substance and the polyol component.

12. The process for manufacturing molded bodies as defined in claim 5, wherein the nucleated molded bodies are thermally aftertreated for at least thirty minutes at temperatures between 110° C. and 180° C.

13. The process for manufacturing molded bodies as defined in claim 5, wherein the nucleated molded bodies are thermally aftertreated for one hour at 160° C.

14. The process for manufacturing molded bodies as defined in claim 1, wherein said molded bodies are small automobile body parts.

15. The process for manufacturing molded bodies as defined in claim 5, wherein said molded bodies are small and large automobile body parts.

* * * * *